United States Patent
Mita et al.

(10) Patent No.: US 6,185,089 B1
(45) Date of Patent: Feb. 6, 2001

(54) ELECTROLYTIC SOLUTION FOR CAPACITOR AND CAPACITOR

(75) Inventors: Satoko Mita, Sodeqaura; Tsuneaki Koike, Tokyo; Yoshinori Takamuku; Hideki Shimamoto, both of Kyoto, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/151,707

(22) Filed: Sep. 11, 1998

(30) Foreign Application Priority Data

Sep. 11, 1997 (JP) ............................................ 9-247144
Dec. 25, 1997 (JP) ............................................ 9-356882

(51) Int. Cl.⁷ .................................................. H01G 9/00
(52) U.S. Cl. ...................... 361/502; 361/503; 252/62.2
(58) Field of Search ...................... 252/62.2; 429/345, 429/330; 361/502, 503, 504

(56) References Cited

U.S. PATENT DOCUMENTS 5,150,283 * 9/1992 Yoshida et al. ..................... 361/502
5,580,684 * 12/1996 Yokoyama et al. ................. 202/62.2

FOREIGN PATENT DOCUMENTS 60-023973 6/1985 (JP) .
01095512A 4/1989 (JP) .
4-184870 7/1992 (JP) .

* cited by examiner

Primary Examiner—Kristine Kincaid
Assistant Examiner—Eric Thomas
(74) Attorney, Agent, or Firm—Birch, Stewart, Kolasch & Birch LLP

(57) ABSTRACT

Non-aqueous electrolytic solutions for capacitor which release little gas and have excellent potential window of electrochemical stability, and which enable capacitors to have excellent charging/discharging cycle properties and safety performance, and capacitors containing such non-aqueous electrolytic solutions. Such non-aqueous electrolytic solutions for capacitors include an electrolyte selected from the group consisting of ammonium salts, phosphonium salts and amidine salts and a solvent for containing at least one phosphoric ester represented by the following formula (I):

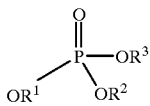

wherein, $R^1$, $R^2$ and $R^3$, which may be the same or different, are an alkyl group, an unsaturated hydrocarbon group or an aryl group.

13 Claims, 1 Drawing Sheet

ELECTROLYTIC SOLUTION FOR CAPACITOR AND CAPACITOR

TECHNICAL FIELD

The present invention relates to a non-aqueous electrolytic solution for capacitors which contains primarily a phosphoric ester, specifically a non-aqueous electrolytic solution for electric double layer capacitors, more specifically a capacitor showing high energy density and excellent withstand voltage and charging/cycle properties, and especially a non-aqueous electrolytic solution that can provide electric double layer capacitors.

TECHNICAL BACKGROUND

Up to the present, capacitors, particularly electric double layer capacitors having a capacity intermediate between that of a battery and that of a capacitor, as a backup power supply for IC's and memories and a supplement or alternative to secondary batteries, have been used widely as a low-power direct-current power supply. In recent years, however, there have been new portable electronic devices coming into being one after another, such as VTR with a built-in camera, cellular phones and laptop computers. Amid this trend, there has been a growing demand that those electric double layer capacitors used as a backup power supply and a supplement or alternative to secondary batteries should have higher energy density.

These electric double layer capacitors, unlike batteries, do not convert a chemical change into electric energy. They utilize a large capacity of the electric double layer that occurs between the electrodes and the electrolytic solution to put in and take out an electric charge in the same manner as the charge and discharge of batteries. Such electric double layer capacitors are made up of two electrodes, a separator and, normally a corrosion-resistant electrolytic solution. The two electrodes, formed from a material having a large surface area such as activated carbon and a binder such as a fluororesin, are so arranged that they face each other via a porous separator made of polyethylene or polypropylene, and the space between these electrodes and the porous separator and the inside of the porous separator are filled with the aforementioned electrolytic solution.

As the electrolytic solution for such electric double layer capacitors, aqueous-solution-based electrolytic solutions and organic-solvent-based electrolytic solutions (non-aqueous electrolytic solutions) are used. However, aqueous-solution-based electrolytic solutions have the problem of it being difficult to obtain a low potential window of electrochemical stability(approx. 1.2 V) and high-energy-density electric double layer capacitors from them.

By contrast, compared with aqueous-solution-based electrolytic solutions, organic-solvent-based electrolytic solutions (non-aqueous electrolytic solutions) show a high potential window of electrochemical stability and therefore make the formation of high-energy-density capacitors possible. Because of this, electric double layer capacitors using non-aqueous electrolytic solutions are beginning to come into use rapidly as backup power supplies for electronic equipment for non-military use.

As such non-aqueous electrolytic solutions, a mixture of a non-aqueous solvent such as a cyclic carbonic ester exhibiting a high dielectric constant and an electrolyte such as tetraethylammoniumtetrafluoroborate, for example, is used.

However, such an electrolytic solution as mentioned above has had the problem of releasing a large amount of gas due to the decarboxylation decomposition of the solvent at high temperature due to the use of cyclic carbonic ester as the solvent and consequently being unable to provide long-life capacitors. Furthermore, when future capacitors have high energy density, the aforementioned electrolytic solutions might be insufficient in the potential window of electrochemical stability. Because of this, it has been hoped that a non-aqueous electrolyte having better charging/discharging cycle properties will come into existence.

SUMMARY

The inventors of the present invention sought a solution to the problems of the conventional technology as described above. The present invention is intended to provide non-aqueous electrolytic solutions for capacitors which release little gas and have an excellent potential window of electrochemical stability, and enable capacitors to have excellent charging/discharging cycle properties and safety performance. This invention is also intended to provide capacitors containing such non-aqueous electrolytic solutions. The non-aqueous electrolytic solution for capacitors to which the present invention relates comprises a solvent for electrolytic solution containing a phosphoric ester represented by the following formula (I) and an electrolyte:

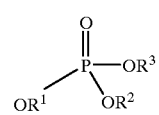

(I)

(wherein, $R^1$, $R^2$ and $R^3$, which may be the same or different, are an alkyl group, an unsaturated hydrocarbon group or an aryl group).

The capacitors to which the present invention relates use the non-aqueous electrolytic solution for capacitors as described above.

The non-aqueous electrolytic solution for capacitors to which the present invention relates releases little gas and shows a high potential window of electrochemical stability and excellent safety performance and charging/discharging cycle properties.

Especially, the use of the non-aqueous electrolytic solution for capacitors to which the present invention relates in the formation of capacitors enables the obtaining of capacitors which generate high voltage, release little gas and show excellent charging/discharging cycle properties and energy density. This effect manifests itself markedly especially when the electrolytic solution is used in electric double layer capacitors.

DETAILED DESCRIPTION

Figure 1:
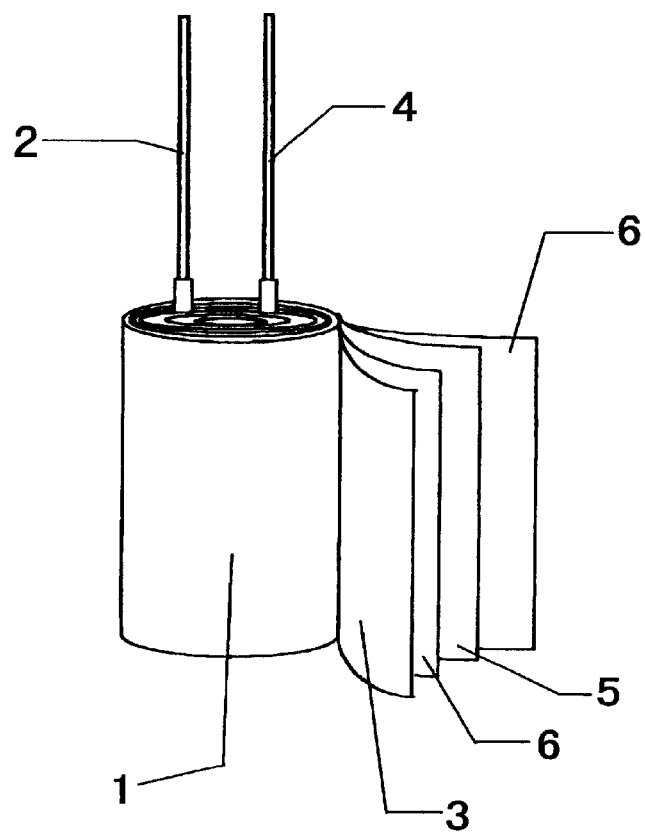
FIG. 1 is a perspective view illustrating the structure of the capacitor element of a wound-type electric double layer capacitor of the present invention.

Given below is a specific description of the non-aqueous electrolytic solutions and capacitors of the present invention:

The non-aqueous electrolytic solution for capacitors to which the present invention relates comprises a solvent containing a phosphoric ester represented by the following formula (I) and an electrolyte.

Phosphoric Ester

First, a description of the phosphoric ester represented by the following formula (I) is as follows:

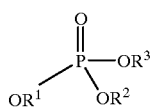
(I)

In the formula (I), $R^1$, $R^2$ and $R^3$, which may be the same or different, are an alkyl group, an unsaturated hydrocarbon group or an aryl group.

The alkyl group may be preferably the group having 1 to 4 carbon atoms. Examples of the alkyl group include methyl group, ethyl group, n-propyl group, i-propyl group, n-butyl group, i-butyl group, sec-butyl group and t-butyl group.

The unsaturated hydrocarbon group may be preferably the group having 2 to 4 carbon atoms. Examples of the unsaturated hydrocarbon group include vinyl group, allyl group and isopropenyl group.

The aryl group may be the group having 6 to 12 carbon atoms. Examples of the aryl group include phenyl group, benzyl group, naphthyl group and biphenyl group.

In the aforementioned formula (I) in the present invention, $R^1$ to $R^3$, which may be the same or different, are preferably the aforementioned alkyl or unsaturated hydrocarbon group, and $R^1$ to $R^3$ are each independently more preferably the same and are selected preferably from among the methyl group ($—CH_3$), ethyl group ($—C_2H_5$) and allyl group ($—CH_2—CH=CH_2$).

Specific examples of such phosphoric esters include trimethyl phosphate, triethyl phosphate, diethylmethyl phosphate, ethyldimethyl phosphate, tripropyl phosphate, tributyl phosphate, triallyl phosphate and allyldimethyl phosphate.

In the present invention the compound represented by the aforementioned formula (I) may be preferably trimethyl phosphate, triethyl phosphate and triallyl phosphate, where $R^1$ to $R^3$ in the formula (I) are preferably the same and selected from among $—CH_3$, $—C_2H_5$ and $—CH_2—CH=CH_2$.

Such a phosphoric ester represented by the aforementioned formula (I) shows excellent acid resistance, is not oxidated when allowed to stand in the atmosphere, and is chemically stable without reacting with water under normal storage conditions or reacting with highly reactive substances such as metal lithium. Furthermore, such a phosphoric ester has the properties of being physically safe, being not readily decomposed thermally and being flame-retardant and resistant to electrochemical oxidation or reduction.

Solvent for the Electrolytic Solution

In the present invention, solvents containing the aforementioned phosphoric ester are used as the solvent for the electrolytic solution. Such a solvent may be at least one solvent of the aforementioned phosphoric esters or a mixed solvent with another solvent.

Examples of such another solvent include cyclic carbonic esters such as ethylene carbonate (1,3-dioxolane-2-one), propylene carbonate (4-methyl-1,3-dioxolane-2-one), butylene carbonate (4,5-dimethyl-1,3-dioxolane-2-one) and vinylene carbonate; chain carbonic esters such as dimethyl carbonate, methylethyl carbonate, diethyl carbonate, methylpropyl carbonate and methylisopropyl carbonate; cyclic esters such as γ-butyrolactone, 3-methyl-γ-butyrolactone and 2-methyl-γ-butyrolactone; chain esters such as methyl formate, ethyl formate, methyl acetate, ethyl acetate, propyl acetate, methyl propionate, methyl butyrate and methyl valerate; cyclic ethers such as 1,4-dioxane, 1,3-dioxolane, tetrahydrofurane, 2-methyl-tetrahydrofurane, 3-methyl-1,3-dioxolane, and 2-methyl-1,3-dioxolane; chain ethers such as 1,2-dimethoxyethene, 1,2-diethoxyethene, diethylether, dimethylether, methylethylether and dipropylether; and sulfur-containing compounds such as sulfolane.

Further, a cyclic carbonic ester, the cyclic carbonic ester having the halogen atom-substituted alkyl group described in Japanese Laid-open Patent Publication HEI 9-63644 may be used in addition to the aforementioned cyclic carbonic esters given as examples. Examples of such cyclic carbonic esters include monofluoromethylethylene carbonate, difluoromethylethylene carbonate and trifluoromethylethylene carbonate. Out of these solvents, cyclic carbonic ester is preferable.

These solvents may be used singly or in combination with one or not less than two of them.

In the present invention, if a mixed solvent of a phosphoric ester represented by Formula (I) and another solvent is used for the solvent for electrolytic solution, a mixture of a phosphoric ester represented by Formula (I) and a cyclic carbonic ester is preferable. The phosphoric ester represented by Formula (I) is contained in such solvent for electrolytic solution preferably in the amount of not less than 0.1 wt %, especially 0.5 wt % to 100 wt %, against the total amount of the solvent for electrolytic solution.

Electrolyte

Specific examples of the electrolyte contained in the non-aqueous electrolytic solution for capacitors to which the present invention relates include ammonium salts such as tetrabutylammonium tetrafluoroborate (($C_4H_9$)$_4$$NBF_4$), tetraethylammonium tetrafluoroborate (($C_2H_5$)$_4$$NBF_4$), triethyl-monomethylammonium tetrafluoroborate (($C_2H_6$)$_3$($CH_3$)$NBF_4$), tetrabutylammonium hexafluorophosphate (($C_4H_9$)$_4$$NPF_6$), tetraethylammonium hexafluorophosphate (($C_4H_5$)$_4$$NPF_6$) and triethyl monomethylammonium hexafluorophosphate (($C_2H_5$)$_3$($CH_3$)$NPF_6$); phosphonium salts such as tetrabutylphosphonium tetrafluoroborate (($C_4H_9$)$_4$$PBF_4$), tetraethylphosphonium tetrafluoroborate (($C_2H_5$)$_4$$PBF_4$), tetrabutylphosphonium tetrafluorophosphate (($C_4H_9$)$_4$$PPF_6$) and tetraethylphosphonium tetrafluorophosphate (($C_2H_6$)$_4$$PPF_6$); and the electrolytes used normally for the electrolytic solutions for electric double layer capacitors, such as an amidine salt including a quaternary salt of an N,N,N'-substituted amidine compound with a carboxylic acid or the like described in the International Publication WO95/15572. As the amidine compound, 1-methyl imidazole, 1-methyl benzimidazole, 1,2-dimethyl imidazole 1,2-dimethyl-1,4,5,6-tetrahydropyrimidine, 1,8-diazabicyclo[5,4,0]undecene-7 and 1,5-diazabicycol[4,3,0]nonene-5 are exemplified in the publication WO95/15572 Publication.

Out of these, ($C_4H_9$)$_4$$NBF_4$, ($C_2H_6$)$_4$$NBF_4$ and ($C_2H_5$)$_3$($CH_3$)$NBF_4$ are preferably used.

The non-aqueous electrolytic solution of the present invention is obtained by dissolving the aforementioned electrolyte in the aforementioned solvent for electrolytic solution. The electrolyte is contained in an amount of normally 0.1 to 3 mol/liter, preferably 0.5 to 1.5 mol/liter in such non-aqueous electrolyte for capacitors.

Since the non-aqueous electrolytic solution for electric double layer capacitors to which the present invention relates contains the phosphoric ester represented by the Formula (I), it releases little gas and shows high withstand voltage and excellent charging/discharging cycle properties.

Moreover, the non-aqueous electrolytic solution of the present invention shows a high flash point and excellent safety performance compared with such conventional solvents used for electrolytic solutions as 1,3-dioxolane, tetrahydrofuran and 1,2-diethoxyethene. Further, the use of $(C_2H_5)_3(CH_3)NBF_4$ enables high electric conductivity to be obtained.

Because of this, the use of he non-aqueous electrolytic solution for electric double layer capacitors to which the present invention relates enables the obtaining of electric double layer capacitors which release little gas and show high withstand voltage and excellent charging/discharging cycle properties.

Capacitors

The electric double layer capacitors are made up of two electrodes, a separator and normally a corrosion-resistant electrolytic solution. The two electrodes, formed from a material having a large surface area such as activated carbon and a binder such as fluororesins, are so arranged that they face each other via a porous separator made of polyethylene or polypropylene, and the space between these electrodes and the porous separator and the inside of the porous separator are filled with the electrolytic solution.

As the electrodes, electrodes formed from a material having a large surface area such as activated carbon and a binder such as fluororesins are used preferably.

As the electrode material, activated carbon is preferable. As examples of activated carbon, fibrous or powder activated carbons can be cited, such as phenol-based, pitch-based, polyacrylonitrile-based and coconut-shell-based activated carbons. Normally, activated carbons having a specific surface area of not less than 1,000 $m^2/g$ are preferable. Further, as examples of the method for activating carbon, the steam activation and alkali activation methods can be cited.

Examples of the binder are carboxymethylcellulose, polyvinylidene chloride, polyvinyl pyrrolidone, polyimide, polyvinyl alcohol and polyacrylic acid. Further, a combination of the aforementioned electrode material (active material) and a collector is normally used preferably for the electrodes.

As the collector, aluminum foil, for example, is used preferably.

As preferable examples of the separator, porous films made from polyethylene or polypropylene can be cited.

Given below is an explanation of a specific example of the electric double layer capacitors, using a drawing.

Figure 2:
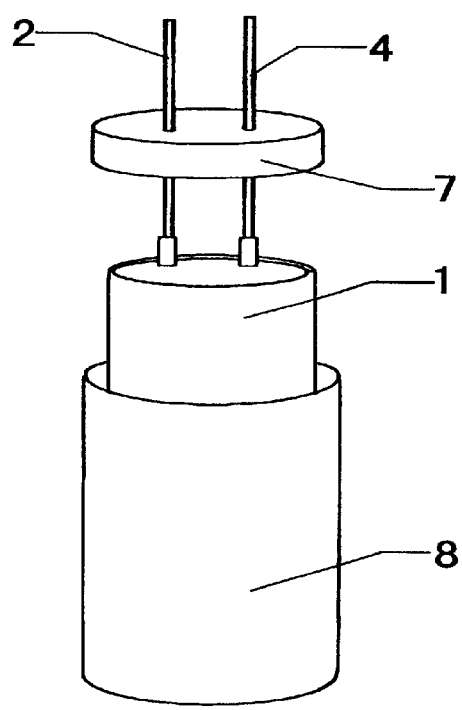
FIG. 2 is a perspective view illustrating the state of the aforementioned capacitor element being inserted into the metal case as a part integral with the sealing part.

FIG. 1 and FIG. 2 are the illustrations showing the structure of the capacitor element of a wound-type electric double layer capacitor of the Examples 1 and 2 and Comparative Example of the present invention and the state of the aforementioned capacitor element being inserted into the metal case as a part integral with the sealing part. In the FIG. 1 and FIG. 2, 1 represents a capacitor element, and this Capacitor Element 1 is formed by winding Polarizable Electrode 3 on the anode side to which Anode Side Lead Wire 2 is connected and Polarizable Electrode 5 on the cathode side to which Cathode Side Lead Wire 4 is connected, with Separator 6 placed in-between. Sealing Part 7, made of rubber, is attached to the Anode Site Lead Wire 2 and Cathode Site Lead Wire 4 of Capacitor Element 1. Further, Capacitor Element 1, previously impregnated with a driving electrolytic solution, is put in Metal Case 8 made of aluminum in a bottomed cylindrical form. As a result of Capacitor Element 1 being housed in Metal Case 8, Sealing Part 7 is located at the opening of Metal Case 8, and the opening of Metal Case 8 is sealed by subjecting the case to the processing of side squeezing and curling. As a result, Sealing Part 7 is caused to fit into the opening of Metal Case 8.

In the foregoing, an explanation is given of an electric double layer capacitor of the wound type. However, the same effect can also be achieved by using the electrolytic solution of the present invention in other electric double layer capacitors having a structure different from that of the wound-type electric double layer capacitor, such as the electric double layer capacitor of the coin type described in the Japanese Published Patent HEI 3-51284 Publication and the electric double layer capacitor of the laminated type described in the Japanese Laid-open Patent HEI 8-78291 Publication.

EXAMPLES

In the following examples are described several preferred embodiments to illustrate the present invention. However, it is to be understood that the present invention is not intended to be limited to the specific embodiments.

Example 1

25 milliliters of non-aqueous electrolytic solution were prepared by dissolving 2.71 g (0.0125 mol) of tetrafluoroborate-4-ethylammonium $((C_2H_5)_4NBF_4)$ in trimethyl phosphate (electrolyte concentration: 0.5 mol/liter). The potential window of electrochemical stability of the electrolytic solution thus obtained was determined.

A wound-type electric double layer capacitor with a rated capacity of 2.3V30F (18 mm in diameter×40 mm in length) as shown in FIG. 1 was prepared by using the non-aqueous electrolytic solution obtained as described above as the electrolytic solution and an aluminum foil, with its surface roughened, coated with a slurry in water of a mixed powder of coconut shell activated carbon powder, acetylene black and carboxymethylcellulose and dried as the polarizable electrode, and a nonwoven fabrics made from polypropylene as the separator. A charging/discharging test was conducted on the wound-type electric double layer capacitor.

In this patent application, the evaluation of the potential window of electrochemical stability of the electrolytic solution and the charging/discharging test were conducted as described below.

The results are shown in Table 1.

Potential Window of Electrochemical Stability

The aforementioned electrolytic solution was put in a three-pole withstand voltage determination cell using a glassy carbon electrode for the work electrode and the counter electrode and an Ag/Ag+ electrode as the reference electrode, and the electric potential was scanned at 10 mV/sec by use of a potentiogalvanostat. With the Ag/Ag+ electrode used as the reference, the range in which not less than 1 μA of oxidation reduction decomposition current did not flow was regarded as the potential window of electrochemical stability.

Charging/Discharging Test

A charging/discharging test was conducted in which the process of charging a capacitor up to a final charging voltage of 3.5V at a charging current of 3A in an environment at 70° C. and then discharging the capacitor to a final discharging voltage of 1.5V at a discharging current of 3A was determined to be one cycle. Under these conditions, the amount of change in the height of the wound-type electric double layer capacitor after 10,000 cycles was determined.

Example 2

25 milliliters of non-aqueous electrolytic solution were prepared by dissolving 2.71 g (0.0125 mol) of tetrafluoroborate tetraethylammonium $((C_2H_5)_4NBF_4)$ in a mixed solvent obtained by mixing trimethyl phosphate and propylene carbonate at a ratio by weight of 1:1 (electrolyte concentration: 0.5 mol/liter). The potential window of electrochemical stability of the electrolytic solution thus obtained was determined in the same manner as described in Example 1.

A wound-type electric double layer capacitor with a rated capacity of 2.3V30F (18 mm in diameter×40 mm in length) was prepared by using the non-aqueous electrolytic solution obtained as described in Example 2 in the same manner as described in Example 1. A charging/discharging test was conducted on the wound-type electric double layer capacitor.

The results are shown in Table 1.

Example 3

25 milliliters of non-aqueous electrolytic solution were prepared by dissolving 2.71 g (0.0125 mol) of tetrafluoroborate tetraethylammonium $((C_2H_5)_4NBF_4)$ in triallyl phosphate. The potential window of electrochemical stability of the electrolytic solution thus obtained was determined in the same manner as described in Example 1.

A wound-type electric double layer capacitor with a rated capacity of 2.3V30F (18 mm in diameter×40 mm in length) was prepared by using the non-aqueous electrolytic solution thus obtained in the same manner as described in Example 1. A charging/discharging test was conducted on the wound-type electric double layer capacitor.

The results are shown in Table 1.

Example 4

25 milliliters of non-aqueous electrolytic solution were prepared by dissolving 2.54 g (0.0125 mol) of tetrafluoroborate triethyl-monomethylammonium $((C_2H_5)_3(CH_2)NBF_4)$ in triallyl phosphate. The potential window of electrochemical stability of the electrolytic solution thus obtained was determined in the same manner as described in Example 1.

A wound-type electric double layer capacitor with a rated capacity of 2.3V30F (18 mm in diameter×40 mm in length) was prepared by using the non-aqueous electrolytic solution thus obtained in the same manner as described in Example 1. A charging/discharging test was conducted on the wound-type electric double layer capacitor.

The results are shown in Table 1.

Comparative Example 1

An electrolytic solution was prepared in the same manner as described in Example 1 except that propylene carbonate was used in place of trimethyl phosphate in Example 1.

A wound-type electric double layer capacitor with a rated capacity of 2.3V30F (18 mm in diameter×40 mm in length) was prepared by using the non-aqueous electrolytic solution thus obtained in the same manner as described in Example 1. A charging/discharging test was conducted on the wound-type electric double layer capacitor.

The results are shown in Table 1.

TABLE 1

| | | | potential window of electrochemical stability (V vs Ag/Ag+) | | Amount of |
| --- | --- | --- | --- | --- | --- |
| | Solvent | Electrolyte | Oxidation potential | Reduction potential | change in height (mm) |
| Example 1 | Trimethyl phosphate | $(C_2H_5)_4NBF_4$ | 1.85 | −2.95 | 0.7 |

TABLE 1-continued

| | | | potential window of electrochemical stability (V vs Ag/Ag+) | | Amount of |
| --- | --- | --- | --- | --- | --- |
| | Solvent | Electrolyte | Oxidation potential | Reduction potential | change in height (mm) |
| Example 2 | Triethyl phosphate/ propylene carbonate (1/1) | $(C_2H_5)_4NBF_4$ | 2.10 | −3.10 | 1.2 |
| Example 3 | Triallyl phosphate | $(C_2H_5)_4NBF_4$ | 4.10 | −2.75 | 0.9 |
| Example 4 | Trimethyl phosphate | $(C_2H_5)_3(CH_3)NBF_4$ | 1.86 | −2.95 | 0.7 |
| Comparative Example 1 | Propylene carbonate | $(C_2H_5)_4NBF_4$ | 1.75 | −2.90 | 2.0 |

It can be seen from Table 1 that since Examples 1, 2, 3 and 4 show a significant potential difference between oxidation potential and reduction potential compared with Comparative Example 1, Examples 1, 2, 3 and 4 show high withstand voltage. Furthermore, it can also be seen that since the wound-type electric double layer capacitors using the electrolytic solutions of Examples 1, 2, 3 and 4 show only a slight change in height after the charging/discharging test compared with the wound-type electric double layer capacitors using the electrolytic solutions of Comparative Example 1, the use of the electrolytic solution of the present invention makes possible the formation of electric double layer capacitors which release little gas and show high withstand voltage and excellent charging/discharging cycle properties.

In the foregoing, the electrolytic solution for capacitors was explained by using electric double layer capacitors as an example. However, the present invention is by no means limited by this, and the same effect can be achieved even in the case of using the electrolytic solution for aluminum electrolytic capacitors.

What we claim is:

1. A non-aqueous electrolytic solution for capacitors which comprises a solvent for an electrolytic solution containing at least one phosphoric ester represented by the following formula (I):

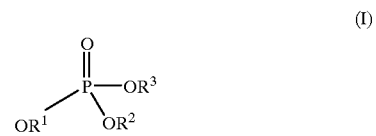

(I)

wherein, $R^1$, $R^2$ and $R^3$, which may be the same or different, are an alkyl group, an unsaturated hydrocarbon group or an aryl group; and an electrolyte selected from the group consisting of ammonium salts, phosphonium salts and amidine salts.

2. The non-aqueous electrolytic solution for capacitors of claim 1, wherein $R^1$, $R^2$ and $R^3$ are an alkyl group having 1 to 4 carbon atoms, an unsaturated hydrocarbon group having 2 to 4 carbon atoms or an aryl group having 6 to 12 carbon atoms.

3. The non-aqueous electrolytic solution for capacitors of claim 1, wherein the amidine salts are quaternary salts of compounds having a N,N,N'-substituted amidine group.

4. A non-aqueous electrolytic solution for capacitors which comprises a solvent for an electrolytic solution containing at least one phosphoric ester represented by the following formula (I):

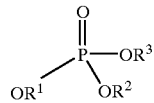
(I)

wherein, $R^1$, $R^2$ and $R^3$, which may be the same or different, are an alkyl group, an unsaturated hydrocarbon group or an aryl group; and an electrolyte is selected from the group consisting of ammonium salts and phosphonium salts.

5. A capacitor using the non-aqueous electrolytic solution for capacitors of claims 1, 2, 3 or 4.

6. The capacitor of claim 5, wherein the capacitor is an electric double layer capacitor.

7. An electric double layer capacitor comprising a first polarizable electrode on an anode side, a second polarizable electrode on a cathode side, a separator and an electrolytic solution, characterized in that the first and second polarizable electrodes are activated carbon powder electrodes and the electrolytic solution is defined in claims 1, 2, 3 or 4.

8. The electric double layer capacitor of claim 7, wherein the polarizable electrodes are the electrodes obtained by coating onto a collector foil, a mixed powder of the activated carbon powder to which acetylene black and carboxymethyl cellulose are added and drying the coating.

9. The non-aqueous electrolytic solution for capacitors of claims 1, 2, 3 or 4, wherein the solvent for electrolytic solution is a mixed solvent of the phosphoric ester and a cyclic carbonic ester.

10. A capacitor using the non-aqueous electrolytic solution for capacitors of claim 9.

11. A non-aqueous electrolytic solution for capacitors which comprises a solvent for an electrolytic solution containing at least one phosphoric ester represented by the following formula (I):

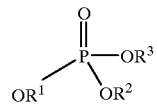
(I)

wherein $R^1$, $R^2$ and $R^3$ are selected from the group consisting of $CH_3$, $C_2H_5$ and $CH_2$—$CH$=$CH_2$; and an electrolyte.

12. The non-aqueous electrolytic solution for capacitors of claim 11, wherein the solvent for electrolytic solution is a mixed solvent of the phosphoric ester and a cyclic carbonic ester.

13. An electric double layer capacitor comprising a first polarizable electrode on an anode side, a second polarizable electrode on a cathode side, a separator and an electrolytic solution, characterized in that the first and second polarizable electrodes are activated carbon powder electrodes and the electrolytic solution is defined in claim 9.

* * * * *